United States Patent [19]
Yoneyama et al.

[11] Patent Number: 6,025,879
[45] Date of Patent: Feb. 15, 2000

[54] SYSTEM FOR MOVING OBJECT DETECTION IN MOVING PICTURE

[75] Inventors: Akio Yoneyama, Tokyo; Yasuyuki Nakajima, Saitama; Kiyono Ujihara, Tokyo, all of Japan

[73] Assignee: Kokusai Denshin Denwa Kabushiki Kaisha, Tokyo, Japan

[21] Appl. No.: 08/909,344

[22] Filed: Aug. 11, 1997

[30] Foreign Application Priority Data

Aug. 29, 1996 [JP] Japan ...................................... 8-247004

[51] Int. Cl.[7] .................................................. H04N 7/32
[52] U.S. Cl. ........................... 348/416; 348/420; 348/699
[58] Field of Search ..................... 348/27, 390, 400–403, 348/407, 409–413, 415, 416, 420, 699; 382/190, 232, 233, 236, 238, 243, 248–250; H04N 7/32

[56] References Cited

U.S. PATENT DOCUMENTS

| | | | |
|---|---|---|---|
| 5,453,799 | 9/1995 | Yang et al. | 348/402 |
| 5,668,600 | 9/1997 | Lee | 348/699 |
| 5,748,789 | 5/1998 | Lee et al. | 382/243 |
| 5,757,668 | 5/1998 | Zhu | 348/402 |
| 5,903,313 | 5/1999 | Tucker et al. | 348/416 |
| 5,926,231 | 7/1999 | Jung | 348/699 |
| 5,929,915 | 7/1999 | Cho | 348/416 |
| 5,929,917 | 7/1999 | Kim | 348/420 |

OTHER PUBLICATIONS

"Extraction of Dynamic Area Using MPEG Data", Institutes of Electronics, Information and Communication Engineers of Japan, Technical report of IEICE (IE–96–25), Jun. 21, 1996 (Abstract only translation).

*Primary Examiner*—Richard Lee
*Attorney, Agent, or Firm*—Westman, Champlin & Kelly, P.A.

[57] ABSTRACT

A system for detecting a moving object in a moving picture, which can detect a moving object by block directly with a highly-accurate, simple process without completely decoding the compressed moving picture data. The picture block coding mode, the motion compensation mode and the motion vector information (information b) decoded in a variable-length decoder 1 and the texture information d detected by a texture information detector 7 are applied to a moving object detection processor 8. The moving object detection processor 8 judges whether the particular block is a moving object or not using the information b or the combined information b and the texture information d. This judgement is effected by a motion vector, a spatial similarity judgement and a temporal similarity judgement. The moving object detection information e resulting from the judgement is sent to a picture image processor 5 for processing the picture information f. A picture display unit 10 can display a non-moving object and a moving object with different brightness and in different colors.

11 Claims, 12 Drawing Sheets

FUTURE REFERENCE PICTURE

FIG. 7B

FUTURE REFERENCE PICTURE

MOVING OBJECT DETECTION PORTION

FIG. 18A

REFERENCE FRAME

REFERENCE BLOCK

FIG. 18B

PRESENT FRAME q

SYSTEM FOR MOVING OBJECT DETECTION IN MOVING PICTURE

BACKGROUND OF THE INVENTION

1. Field of the Invention

The present invention relates to a system for moving object detection in a moving picture, or more in particular to a system capable of detecting a moving object in a moving picture quickly and accurately from the coded moving picture information.

2. Description of the Related Art

Conventionally-proposed moving object detection systems include a method in which a background picture is stored in advance and the difference is taken between the background picture and an object picture thereby to detect that the object picture is a moving picture, and a method in which the direction and magnitude of the movement of each pixel between frames are calculated so that the portion for which the motion is calculated is detected as a motion area. In each of these methods, an appropriate algorithm is applied directly to the moving picture data to determine a moving object area.

In another conventional system for moving object detection, the moving picture data is not directly used for the moving object detection process, but a moving object is detected directly from the compressed moving picture information. In this method, the compressed moving picture data are not decoded for completely reproducing the moving picture, but only the information required for the detection of the moving object area is extracted from the compressed moving picture information, and the detection process is implemented on the basis of the extracted information. Conventionally, Mabuchi, Inagaki, et al. have proposed "Extraction of Dynamic Area Using MPEG Data", Institutes of Electronics, Information and Communication Engineers of Japan, TECHNICAL REPORT OF IEICE (IE-96-25).

According to this method, each block in a picture is checked as to whether it has the motion vector information used for the motion compensation. In the presence of a motion vector in a block, it is judged that a moving object exists in the particular block. This motion vector detection is accomplished by block.

In the former one of the two methods mentioned above, all the moving picture data are processed for moving object detection. Specifically, when detecting a moving object from the moving picture data stored in compressed data form, the picture is restored by decoding and then the moving object is detected. The problem, therefore, is a long processing time and a large amount of processing required for moving object detection. Also, in the case where a motion picture is compressed while a moving object is detected, both a equipment for moving object detection and a equipment for compression are required, resulting in a system very bulky as a whole.

In the latter method, on the other hand, a simple moving picture produced by computer graphics is used for simulation in the paper, and therefore the background pixels are uniformly painted. Thus, there is no possibility of a motion vector being generated in the background portion at the time of coding, with the result that a moving object can be easily and accurately detected.

In an actual motion picture of real world, however, various external factors including air fluctuations and meteorological conditions such as wind substantially eliminate a completely stationary state in which all things are under constant change. This change of state is picked up as a change at the time of compression coding, and is added to a particular block as motion vector information for motion compensation. Also, as for a block having substantially uniform pixel data arranged therein, the motion vector often changes at random in both angle and size in the process of compression coding. In such a case, even if the particular portion is included in the background, the block is erroneously detected as a moving object portion. In other words, in a picture of the actual world, a moving object cannot be detected accurately simply according to the presence or absence of a motion vector.

Further, the coded data of a moving picture by simulation uses only the forward prediction for motion compensation of each block. The coding system, however, also involves both a backward or a bidirectional prediction. No detection method for such a case is not described at all.

Also, there are some blocks which are coded with the information in the frame, i.e. intra-coded. They usually have no motion vector. In such a case, the problem is that a moving object cannot be detected for the particular block.

SUMMARY OF THE INVENTION

The object of the present invention is to provide a system for detecting a moving object in a moving picture which solves the above-mentioned problems of the prior art and which is capable of detecting a moving object on coded block base directly with high accuracy and ease without completely decoding the compressed moving picture data.

In order to achieve the above-mentioned object, according to the present invention, there is provided a system for moving object detection in moving picture, comprising compressed picture information extraction means for partially decoding the compressed data of a moving picture input for each block and extracting the picture information constituting a part of the data from said partially decoded data; adaptive detection scheme selection means for classifying the moving object detection processing method by a coding mode for each frame and a motion compensation mode for each block obtained by said compressed-picture information extraction means; moving object detection prediction means for estimating the presence or absence of a moving object in a block using the motion vector of a spatio-temporally adjacent frame selected by the adaptive detection scheme selection means in the case where said block is an intra-coded block and for outputting the moving object information; and basic moving object detection means for not detecting said block as a moving object area when the size of a motion vector of said block obtained from said compressed picture information extraction means is at least lower than a threshold level selected by the suitable detection scheme selection means in the case where said block is not an intra-coded block and for outputting the moving object information.

According to this invention, unlike in the prior art, a moving object can be detected on coded block base without directly handling a moving picture having a large bit rate. Also, a moving object can be detected with high speed and accuracy from a coded moving picture data using an arbitrary prediction method.

DETAILED DESCRIPTION OF THE PREFERRED EMBODIMENTS

Figure 1:
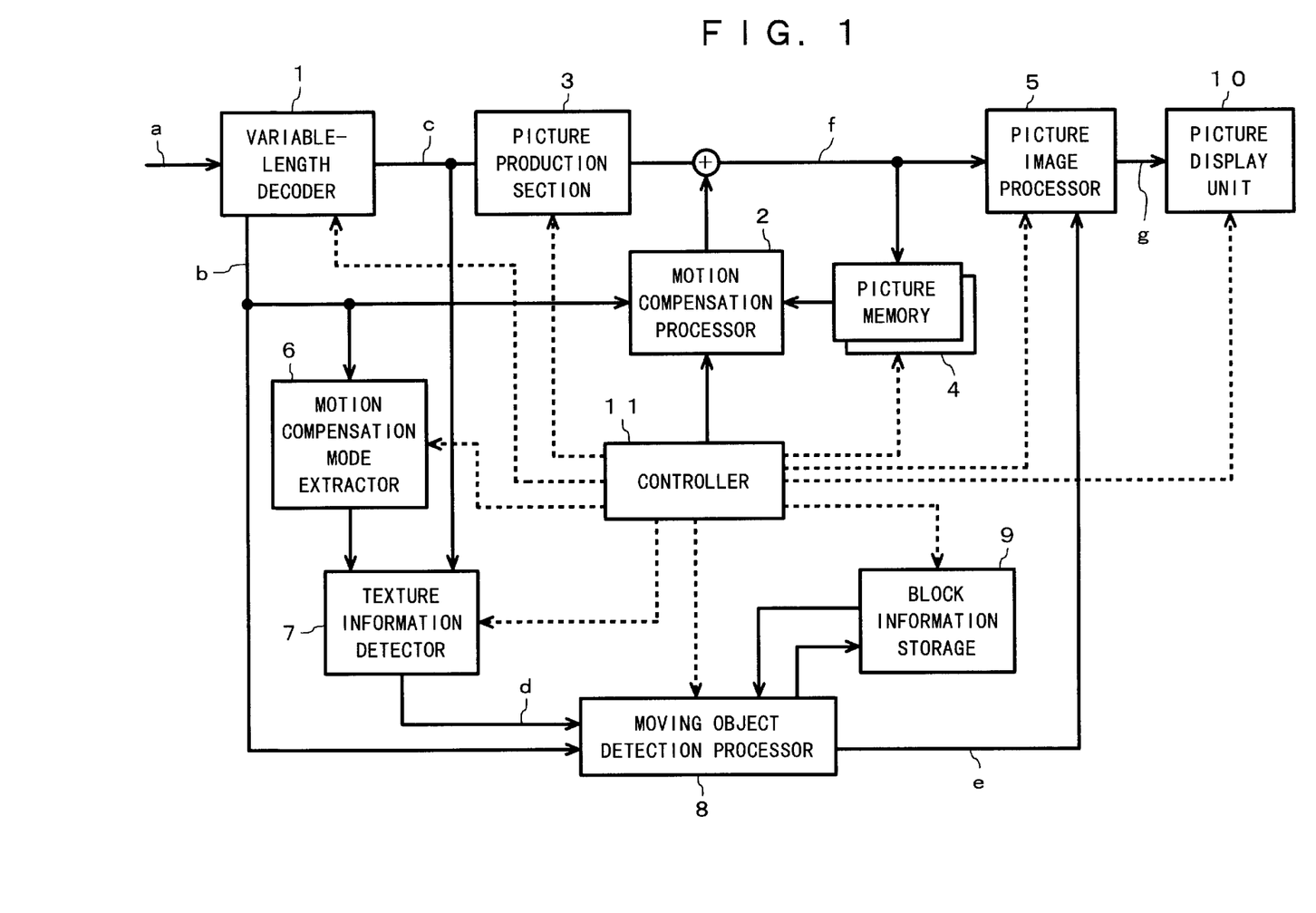
FIG. 1 is a block diagram schematically showing a configuration of the invention.

The present invention will be described in detail below with reference to the accompanying drawings. FIG. 1 is a block diagram showing a configuration according to an embodiment of the invention. This embodiment is intended to detect a moving object from the coded data of a moving picture compressed according to MPEG1 (ISO/IEC11172) providing an international standard of a moving picture coding scheme. The invention, however, is not limited to this scheme. The solid lines in the drawing represent data flow, and the dotted lines the flow of control signals.

As shown in FIG. 1, the coded data a of a compressed moving picture data is applied to a variable-length decoder 1 thereby to partially decode the coding mode, the motion compensation mode, motion vector amount, two-dimensional DCT coefficient, etc. of a frame or a block. Among the information thus decoded, the coding mode, the motion compensation mode, motion vector information and the like (hereinafter collectively called "the information b") are applied to a motion compensation processor 2. The two-dimensional DCT coefficient, c on the other hand, is applied to a picture production section 3 where it is inversely converted to restore a frame of picture.

The coding mode indicates whether a frame is an intra-coded frame, a bidirectionally predictive-coded frame (B picture) or a forward predictive-coded frame (P picture). The motion compensation mode, on the other hand, indicates whether a block is an intra-coded block, a forward predictive-coded block, a backward predictive-coded block or a bidirectionally predictive-coded block.

In the case of a frame which is coded using the motion compensation (i.e., an inter-coded frame), on the other hand, the picture for a small section extracted by the motion compensation processor 2 from the frame picture stored in a picture memory 4 and the picture produced by inverse DCT in the picture production section 3 are added to each other for restoration, and the resulting picture is transferred to a picture image processor 5. The frame in the restored picture information used for inter-frame prediction is stored also in the picture memory 4.

Among the information b, the motion compensation mode is extracted by a motion compensation mode extractor 6, and together with the two-dimensional DCT coefficient c, transferred to a texture information detector 7. The texture information detector 7 detects the texture information d of each block using the input information. Further, the information b is transferred to a moving object detection processor 8 for performing the detection process of a moving object together with the texture information d of each block obtained by the texture information detector 7.

The moving object detection processor 8 performs the process for detecting a moving object for each block on the basis of the coding mode, the motion compensation mode, the motion vector (information b) and the texture information d input thereto, and applies the resulting moving object detection information e to the picture image processor 5. Also, the information for each block required for moving object detection is stored in a block information storage 9.

The picture image processor 5 adds the moving object detection information e transferred thereto from the moving object detection processor 8 to the restored picture information f transferred thereto from the picture production section 3 or the like, and transfers the resulting picture information g to a picture display unit 10. The picture display unit 10 displays the processed picture input thereto.

A controller 11 outputs a signal for controlling the operation of the processors 1 to 10 as shown by dotted lines.

Figure 2:
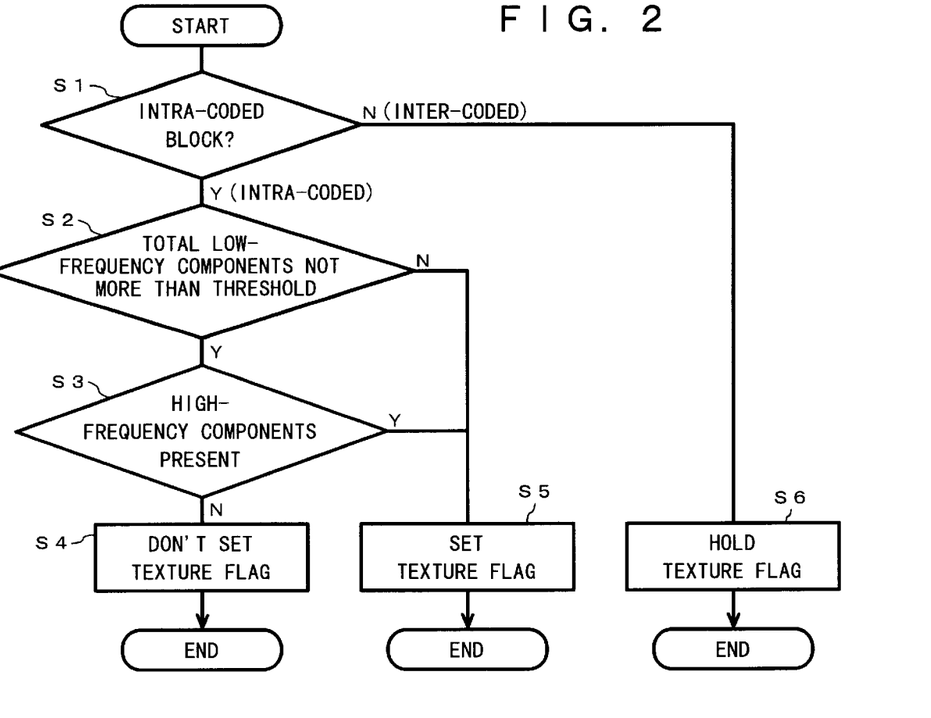
FIG. 2 is a flowchart showing the operation of a texture information detector shown in FIG. 1.

Now, the operation of the texture information detector 7 will be explained in detail with reference to the flowchart of FIG. 2. First, step S1 judges whether or not the motion compensation mode of an input block uses the intra-block coding, i.e., whether the intra-coding is used or not. In the case where the judgement is negative, i.e., in the case where the motion compensation mode of the input block uses the inter-frame predictive coding (inter-coding), the information of the block represents the inter-frame difference information. The picture cannot be reproduced by this information alone and therefore the process proceeds to step S6 for holding the texture flag of the corresponding block of the past frame. In other words, the texture information of the block at the same latest spatial position in the temporal past is directly held.

Figure 3:
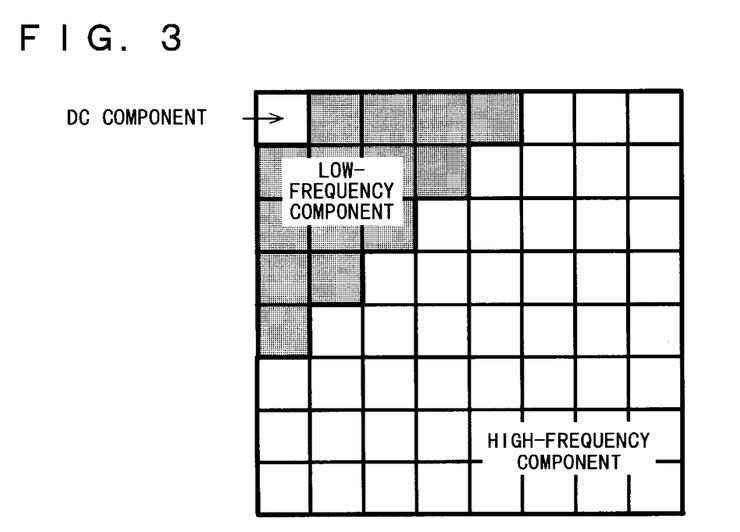
FIG. 3 is a diagram for explaining a part of the process in FIG. 2.

In the case where the judgement in step S1 is affirmative, i.e., in the case where the particular block uses the intra-block coding, on the other hand, the process proceeds to step S2, where the two-dimensional DCT coefficients except for the DC component is classified into a low-frequency component and a high-frequency component. This classification is accomplished, as shown in FIG. 3, for example, by dividing a DCT coefficient matrix into the upper left coefficients (except for the DC component) and the lower right coefficients. With regard to the low-frequency component coefficients, the total sum of absolute values of the components is determined and compared with a predetermined threshold value. In the case where the judgement in step S2 turns affirmative, i.e., in the case where the total sum of the low-frequency component coefficients is reduced to a level not more than the threshold valve, the process proceeds to step S3 to check the high-frequency components.

Then, step S3 judges whether there exists a high-frequency component. If the judgement is negative, the picture of the particular block is considered substantially uniform and lacks texture, and the process proceeds to step S4. In step S4, the process is executed to prevent a texture flag from being set. In the case where the judgement in step S2 is negative, on the other hand, or in the case where the judgement in step S3 is affirmative, then it is obvious that the pixels in the block are variable in density, so that the process proceeds to step S5 for setting the texture flag.

The texture information detector 7 transfers to the moving object detection processor 8 the result of texture information detection for all the blocks determined in steps S4 to S6. Depending on the coding scheme involved, the block size representing the two-dimensional DC component is 8×8 pixels, for example, which may be different from the 16×16 pixels of the unit block for motion compensation. In such a case, the block unit for motion compensation is used as a reference. Thus a logic sum or a logic product is taken from the 2×2 blocks representing the two-dimensional DCT component, thereby making it possible to unify the block sizes.

Figure 4:
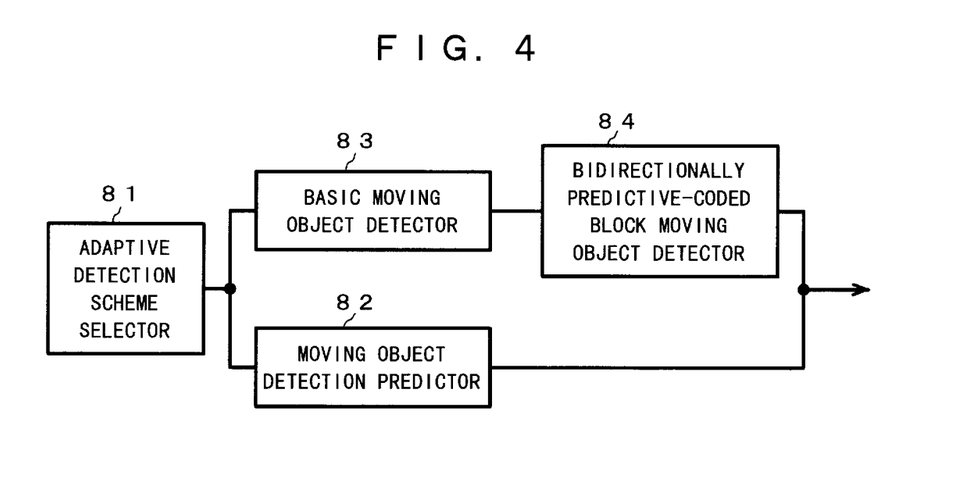
FIG. 4 is a block diagram showing a configuration of the essential parts according to an embodiment of the invention.

Now, a configuration of the moving object detection processor 8 of FIG. 1 according to an embodiment will be explained with reference to FIG. 4. The moving object detection processor 8 includes an adaptive detection scheme selector 81, a moving object detection predictor 82, a basic moving object detector 83 and a bidirectionally predictive-coded block moving object detector 84.

Figure 5:
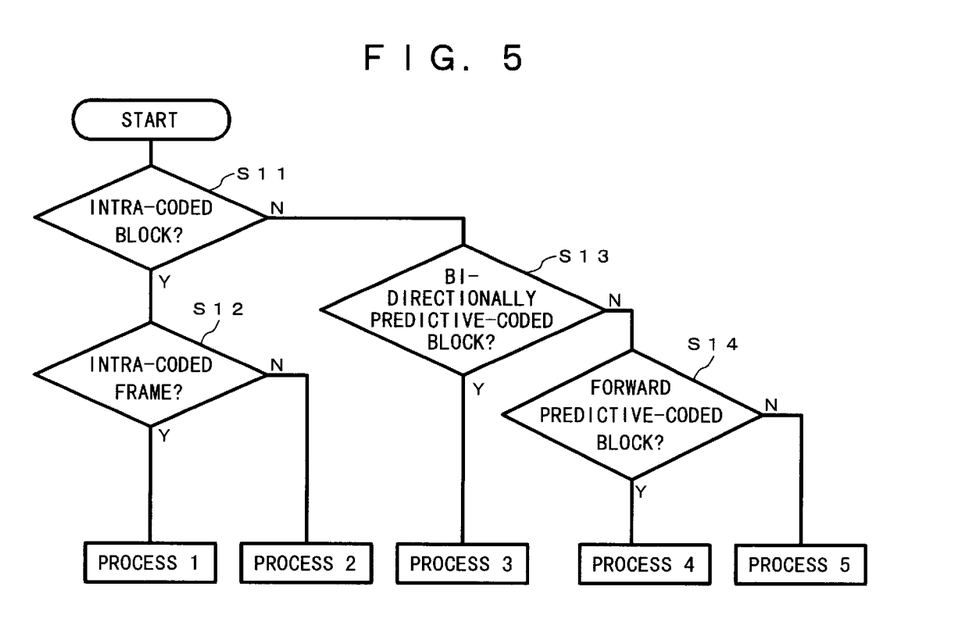
FIG. 5 is a flowchart showing the operation of an adaptive detection system scheme selector according to the first embodiment.

The function or operation of each configuration described above will be explained in detail. First, the adaptive detection scheme selector 81 classifies the process items into five according to the coding mode of the frame including the particular block and the motion compensation mode of the block as shown in FIG. 5.

Step S11 judges whether or not the particular block is an intra-frame coded block (intra-coded block). If the judgement is affirmative, the process is passed to step S12 for judging whether or not the frame is an intra-coded frame. Specifically, judgement is made as to whether the all the blocks in a frame are intra-coded frames or the frame includes a block other than the intra-coded block, i.e., an inter-frame predictive-coded block (i.e., an inter-coded block). If the judgement is affirmative, the process 1 is entered. In the case where the judgement in step S12 is negative, on the other hand, the process 2 is entered.

Then, if the judgement in step S11 is negative, i.e., if the particular block is an inter-frame predictive-coded block, there always exists a motion vector. Thus the process proceeds to step S13 for judging whether or not the block is a bidirectionally predictive-coded block. If the judgement is affirmative, the process 3 is entered. In the case where this judgement is negative, on the other hand, the process proceeds to step S14 for judging whether or not the block is a forward predictive-coded block. If this judgement is affirmative, the process 4 is entered. In the case where the judgement is negative, i.e., in the case where the block is a reversely predictive-coded block, on the other hand, the process 5 is entered.

First, the processes I to 5 will be briefly explained. The process 1 covers all the blocks included in the frame subjected to intra-frame coding. The block does not have any motion vector information, and therefore whether or not the block is a moving object is estimated by the moving object detection predictor 82 from the moving object detection information of the temporally and spatially adjacent blocks. The resulting information is used as the moving object detection information of the particular block.

The process 2, on the other hand, handles the intra-coded block existing in the P picture (i.e., the forward predictive-coded frame referenced for prediction of other frames) or B picture (i.e., the frame subjected to inter-frame predictive coding not referenced for prediction of other frames). This block has no motion vector either. The moving object detection predictor 82, therefore, estimates whether the particular block is a moving object or not while referencing the moving object detection information of the surrounding blocks in the frame.

The process 3 covers a coded block using the bidirectional inter-frame prediction. Each block has both the forward motion vector information and the reverse motion vector information. This block is processed in the basic moving object detector 83 and then processed in the bidirectionally predictive-coded block moving object detector 84.

The process 4 handles a block coded using the forward inter-frame prediction. This block has the forward motion vector information, and exists in the P picture or the B picture. This block is processed in the basic moving object detector 83.

The process 5 is intended for a coded block using the reverse inter-frame prediction, which block has the reverse motion vector information. This block is processed in the basic moving object detector 83.

Now, the operation of the moving object detection predictor 82 described above will be explained with reference to FIGS. 6 and 7.

Figure 6:
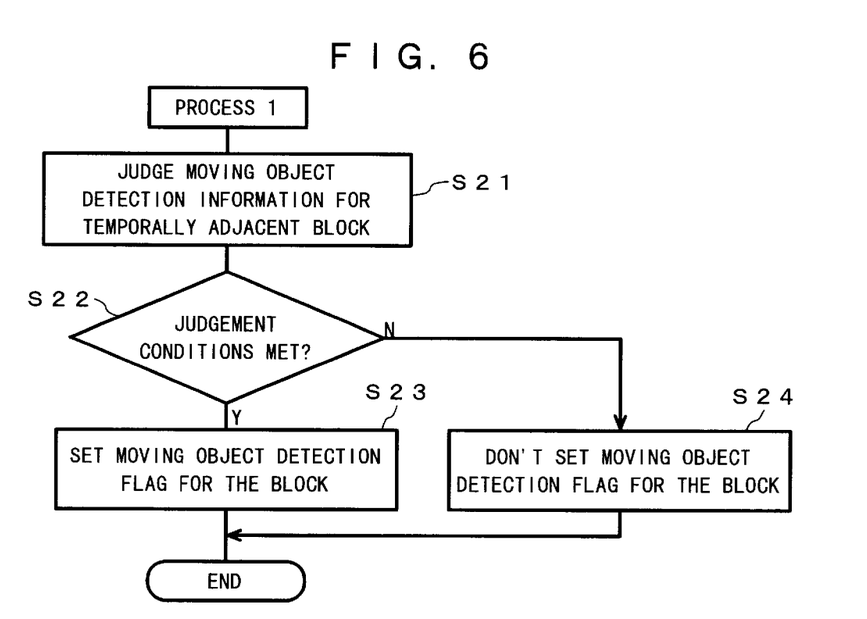
FIG. 6 is a flowchart showing the operation of process 1.
Figure 7A:
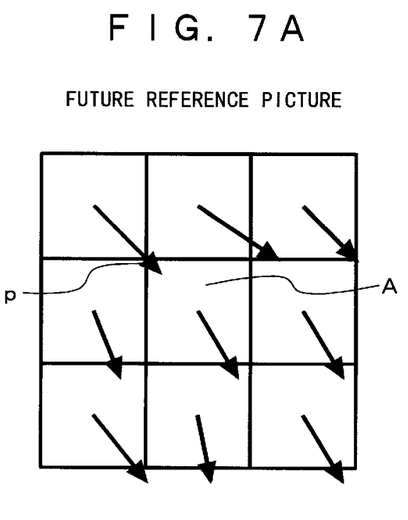
FIGS. 7A and 7B are diagrams for explaining a modification of process 1.
Figure 7B:
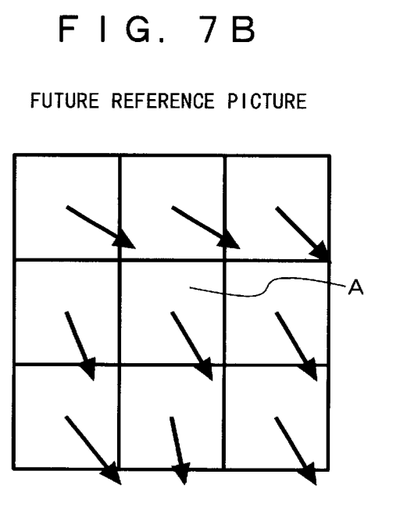

The process 1, as shown in FIG. 6, first judges whether a particular block is a moving object or not from a block temporally adjacent thereto. Specifically, step S21 judges whether a block located at the same position as the particular block in the past reference picture or at the same position as the particular block in the future reference picture has the moving object detection information. In the case where the judgement is that the moving object detection information so exists, the judgement in step S22 is affirmative, and the process proceeds to step S23. Step S23 sets the moving object detection flag of the particular block. In the case where the judgement in step S22 is negative, on the other hand, the process proceeds to step S24 to prevent the moving object detection flag for the particular block from being set.

In a modification shown in FIG. 7A, each vector is arranged in a block with reference to the motion vectors of a block at the same position and an adjacent block in the future reference picture. In the case where the leading end p of a vector is present in the central block A, judgement can be made that a moving object is detected in the particular block of the present picture. In FIG. 7B, the leading end of the vector is not located in the central block A and therefore the judgement is not made that a moving block is detected in the block of the present picture.

A similar processing can be executed for the past reference picture. In this case, however, all the vectors involved are required to be magnified by a factor of −1 in advance. In the case where this process is executed for both the future reference picture and the past reference picture, the logic sum and the logic product are taken of the vectors and the result is used as the moving object detection information for the block.

Figure 8:
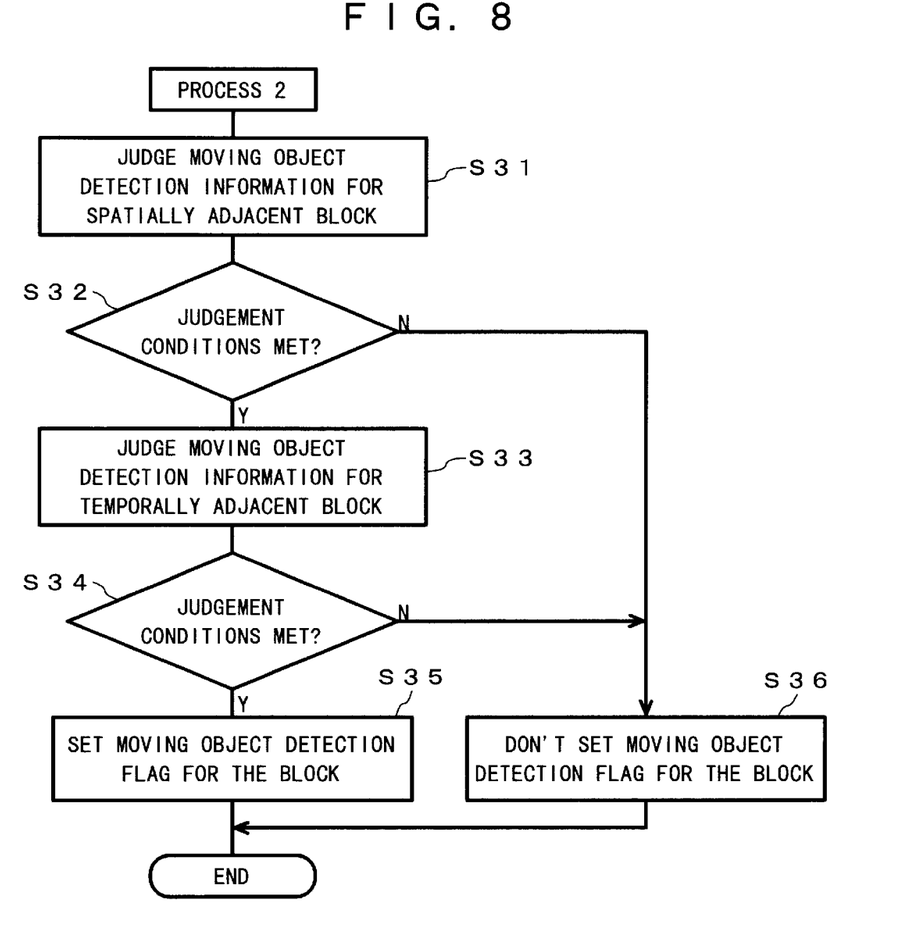
FIG. 8 is a flowchart showing the operation of process 2.

Now, explanation will be made about the operation of the process 2 performed by the moving object detection predictor 82. The process 2, as shown in FIG. 8, first judges whether a particular block is a moving object or not from a block spatially adjacent to the first block or from an adjacent block in the same picture. Specifically, step S31 judges whether the moving object detection information exists in adjacent blocks in the same picture. Step S32 judges whether or not the number of the blocks detected as a moving object exceeds a threshold value. If the judgement is affirmative, it is judged that the particular blocks are detected as a moving object. In the case where the judgement in step S32 changes to affirmative, the process proceeds to step S33 for judging whether a particular block is a moving object or not from a temporally adjacent block. This judgement is identical or equivalent to step S21 of FIG. 6 and will not be described. In the case where the judgement in step S34 is affirmative, the process proceeds to step S35 for setting the moving object detection flag in the block. When the judgement in step S32 or S34 is negative, on the other hand, the process proceeds to step S36 for preventing the moving object detection flag from being set for the block. For the sake of simplicity, steps S33 and S34 may be done without.

Figure 9:
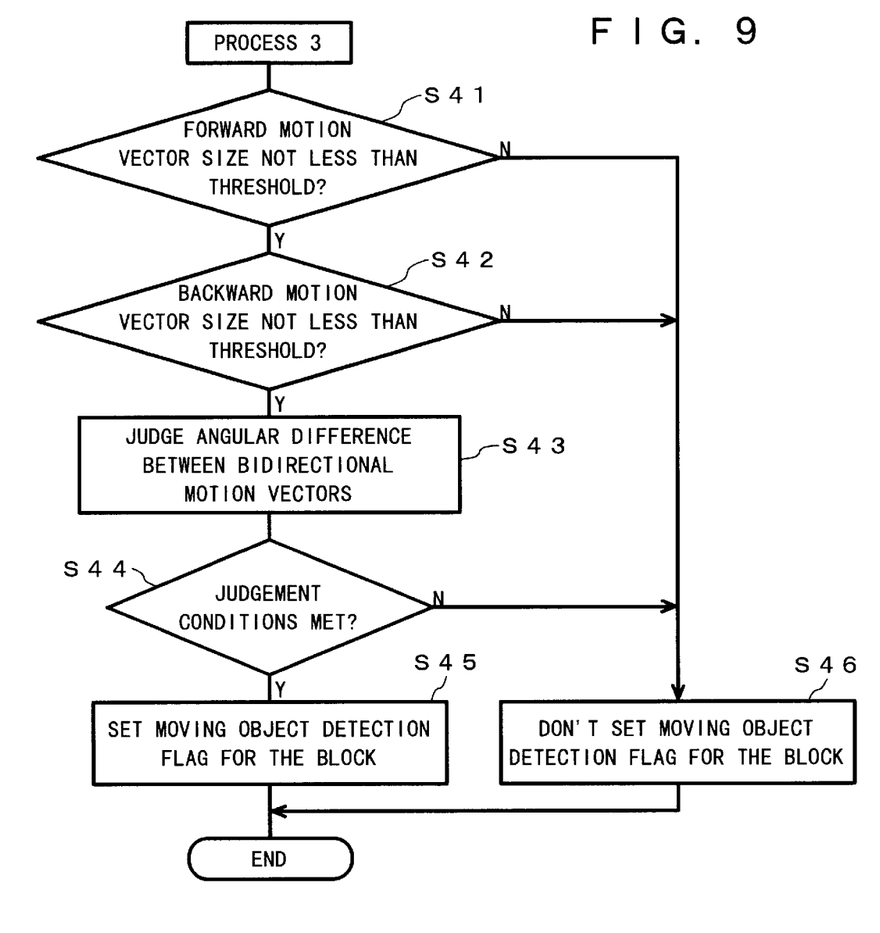
FIG. 9 is a flowchart showing the operation of process 3.

Now, the process 3 executed in the basic moving object detector 83 and the bidirectionally predictive-coded block moving object detector 84 will be explained with reference to FIG. 9. The process 3, as shown in FIG. 9, judges whether a particular block is a moving object or not from the bidirectional motion vector of the block.

Figure 10A:
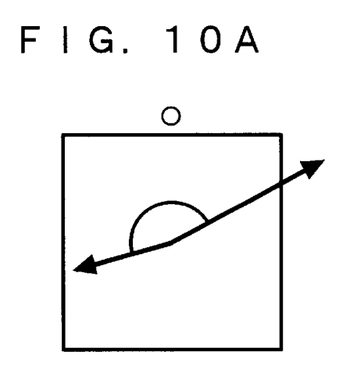
FIGS. 10A and 10B are diagrams for explaining a part of process 3.
Figure 10B:
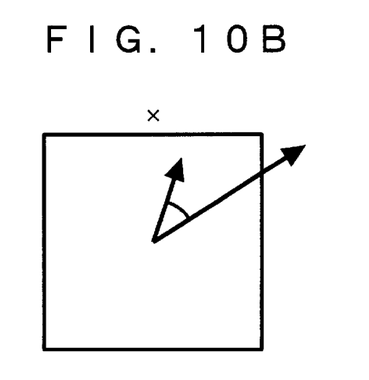

Specifically, step S41 judges whether the magnitude of the forward motion vector in the bidirectional motion vector is not less than a threshold value. If this condition is satisfied, the process proceeds to step S42 for judging whether the size of the backward motion vector is more than the threshold level. In the case where the judgement is affirmative, the process proceeds to step S43 for determining the angular difference of the bidirectional motion vectors as shown in FIGS. 10A, 10B. Step S44 judges that the block is a moving object when the angular difference is not less than a threshold value, and that the block is not detected as a moving object in the case where the angular difference is less than the threshold level. The reason of this judgement that since a moving object normally moves substantially lineally, the angular difference of the bidirectional motion vector is normally large. A small angular difference as shown in FIG. 10B, which is caused by the efficiency of the compression, often occurs in the area without actual moving object.

In the case where the judgement in step S44 is affirmative, the process proceeds to step S45 for setting the moving object detection flag for the block. If the judgement is negative in step S41, S42 or S44, on the other hand, the process proceeds to step S47 for preventing the moving object flag from being set for the block.

Figure 11:
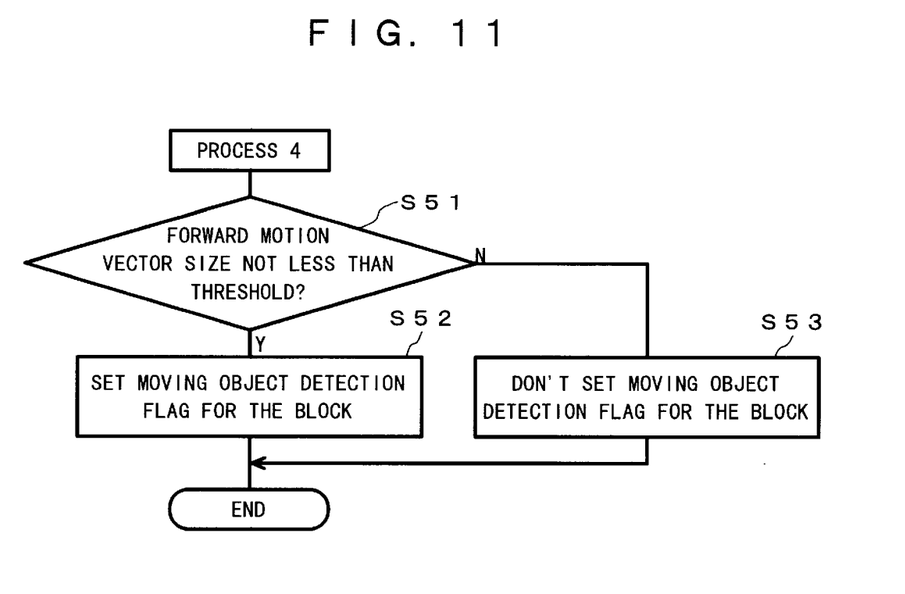
FIG. 11 is a flowchart showing the operation of process 4.
Figure 12:
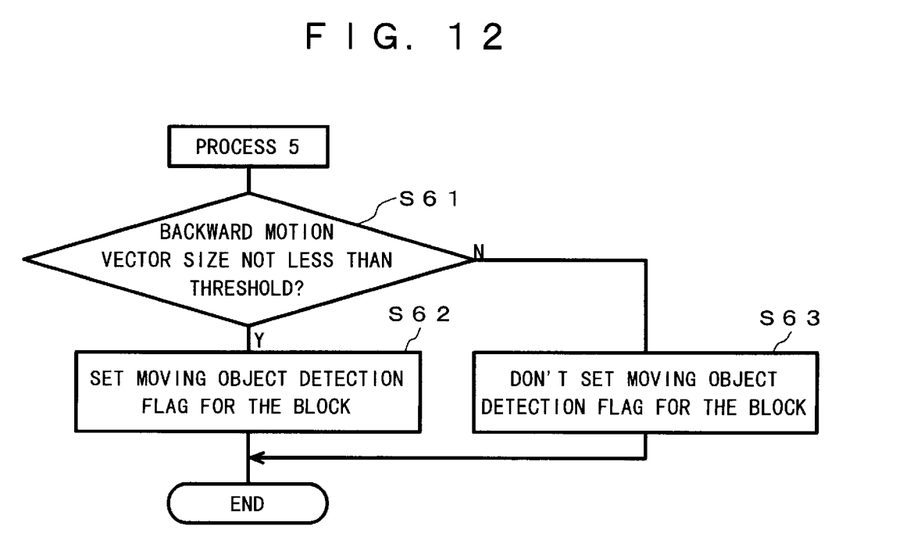
FIG. 12 is a flowchart showing the operation of process 5.

Now, the processes 4 and 5 executed in the basic moving object detector 83 will be explained with reference to FIGS. 11 and 12. The process 4 judges first in step S51 thereof whether the size of the forward motion vector is not less than a threshold level. If the judgement is affirmative, the process proceeds to step S52 for setting the moving object detection flag for the block in the same block. In the case where the judgement in step S51 is negative, on the other hand, the process proceeds to step S53 for preventing the moving object detection flag from being set for the block.

The process 5 judges in step S61 thereof whether the size of the backward motion vector is not less than a threshold level. If the judgement is affirmative, the process proceeds to step S62 for setting the moving object detection flag for the block in the block. If the judgement in step S61 is negative, on the other hand, the process proceeds to step S63 for preventing the moving object detection flag from being set for the block.

As described above, the moving object detection information e produced in the moving object detection processor 8 of FIG. 1, i.e., the moving object detection flag for a block is applied to the picture image processor 5. In the picture image processor 5, the restored picture information f reproduced from the picture production section 3 and the motion compensation processor 2 is processed using the moving object detection information e input from the moving object detection processor 8. A block which has not been detected as a moving object, for example, is displayed with a lower picture brightness, whereas a block that has been detected as a moving object is displayed as a reproduced picture with the original brightness. As an alternative, a block that has not been detected as a moving object is displayed in a specified color. The result of such a processing is applied to the picture display section 10.

Figure 13:
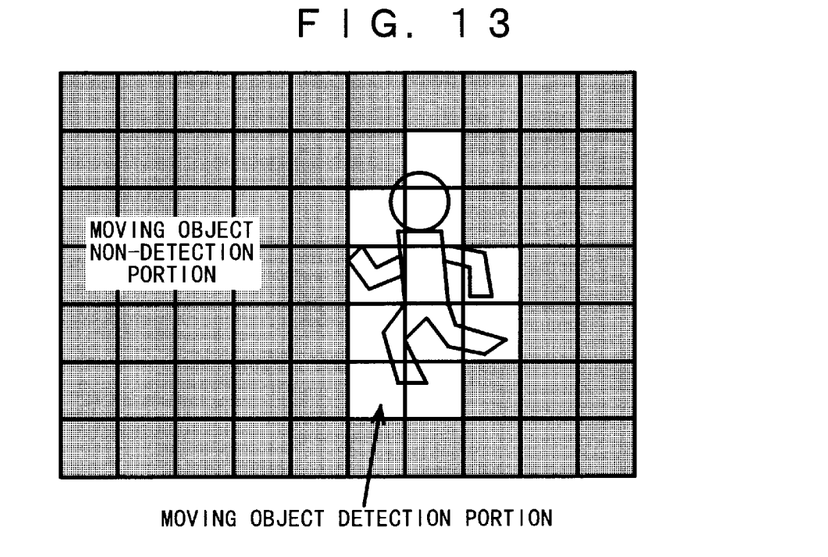
FIG. 13 is a diagram showing an example picture displayed on a picture display section of FIG. 1.

The picture display section 10 displays the picture information g transferred thereto from the picture image processor 5 on a display unit or the like. As a result, the portion of the picture display unit 10 not detected as a moving object is displayed with a lower brightness or in a specified color, while the portion of the picture display unit 10 detected as a moving object is displayed with the original brightness or in the original color, as shown in FIG. 13. A moving object can thus be displayed in a more apparent fashion.

Now, a modification of this embodiment will be explained. In the foregoing description, the texture flag detected in the texture information detector 7 is not reflected in the moving object detection. In the modification under consideration, however, such a texture flag can be reflected so. Concretely, a judgement process as to whether or not a texture flag is set is added to the processes of FIGS. 6, 8, 9, 11 and 12 described above. In this way, when this judgement is affirmative, the moving object detection for a block is continued, whereas when the judgement is negative, the process immediately proceeds to a step for preventing the moving object detection flag from being set for the block.

Figure 14:
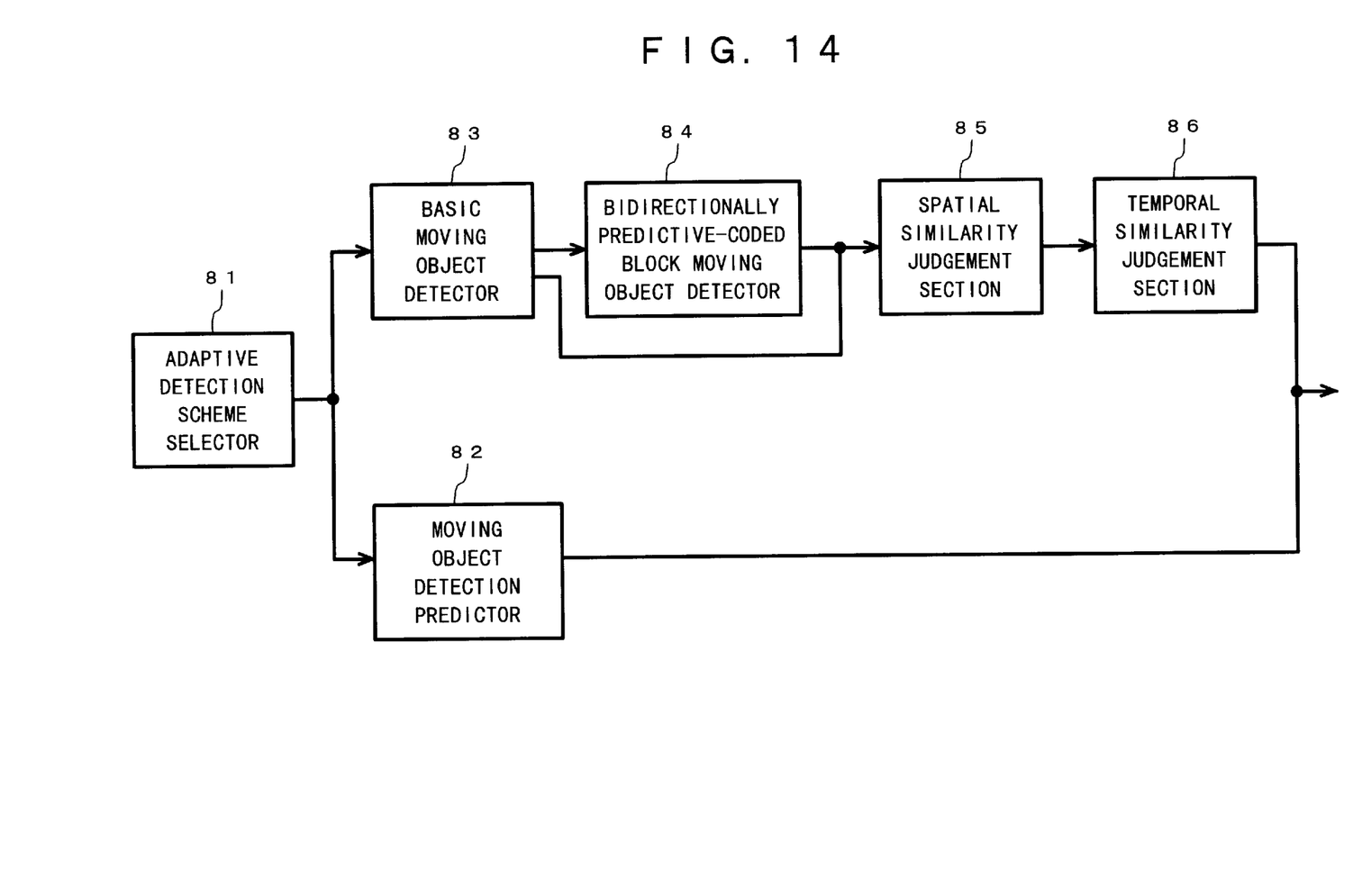
FIG. 14 is a block diagram showing a configuration of the essential parts according to a second embodiment of the invention.

Now, a second embodiment of the invention will be explained with reference to FIG. 14. In FIG. 14, numeral 85 designates a spatial similarity judgement section, and numeral 86 a temporal similarity judgement section. Other reference numerals designate the same or equivalent component parts, respectively, in FIG. 4.

The operation of this embodiment will be described. The processes 1 and 2 performed by the moving object detection predictor 83 are the same as the corresponding processes in the first embodiment, and therefore not be described again. The operation will be explained, therefore, about the processes 3, 4 and 5 involving the spatial similarity judgement section 85 and the temporal similarity judgement section 86. In the processes 3, 4 and 5, the same or equivalent operations as in FIGS. 9, 11 and 12 are designated by the same step numbers, respectively.

Figure 15:
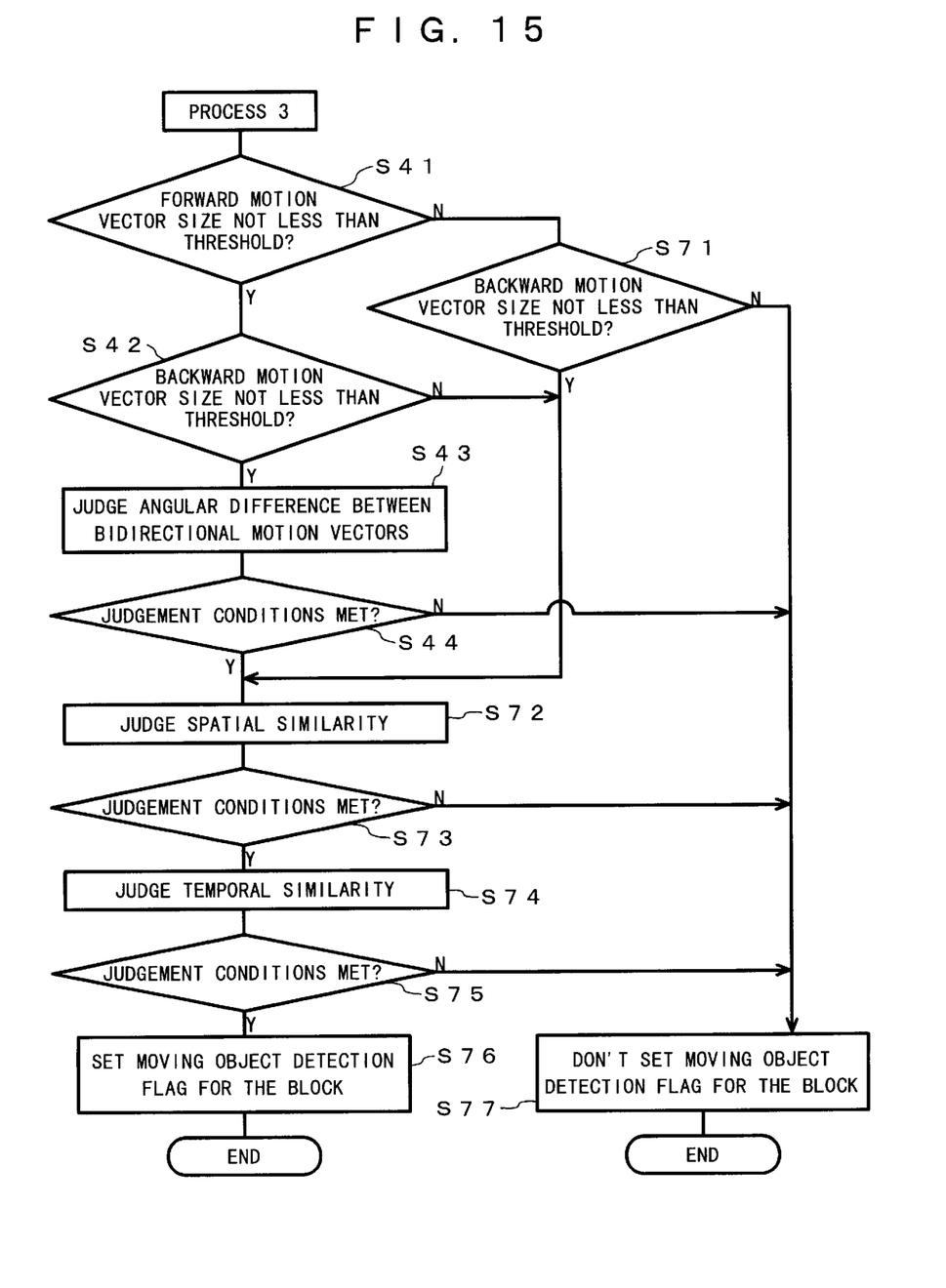
FIG. 15 is a flowchart showing the operation of process 3.

The process 3, as shown in FIG. 15, first performs the operation of steps S41 to S44 described with reference to FIG. 9. When the judgement in step S41 is negative, the process proceeds to step S71 for judging whether or not the size of the backward motion vector is not less than a threshold level. When this judgement is affirmative, the process proceeds to step S72. In the case where the judgement is negative, on the other hand, the process proceeds to step S77 for preventing the moving object detection flag from being set for the particular block. Also, in the case where the judgement in step S42 is negative, the process proceeds to step S72.

Step S72 performs the process of the spatial similarity judgement section 85, i.e., the spatial similarity judgement. In the spatial similarity judgement process, an angular difference is determined between the motion vector of a block spatially adjacent to a particular block and having a motion vector in the same direction of prediction with a size thereof not less than a threshold level on the one hand and the motion vector of the particular block on the other hand. It is then judged whether there is any block for which the angular difference is not more than the threshold level. In the presence of such a block, the judgement in step S73 is affirmative and the next process is entered. In the absence of such a block, on the other hand, the judgement above is negative, so that the process proceeds to step S77 for judging that a moving object is not detected for the particular block.

As a modification, assume that the ratio between the number of blocks with the angular difference of the motion vectors thereof exceeding a threshold level and the number of blocks with the angular difference between the motion vectors thereof not more than the threshold level is not more than a predetermined value, or in the case where there exists an intra-frame coded block in an adjacent block, then the judgement in step S73 may be considered affirmative and the process may proceed to the next step.

Step 74 performs the process of the temporal similarity judgement section 86, i.e., the temporal similarity judgement process. This temporal similarity judgement process judges whether there exists a motion vector in a block at the same spatial position in the frame referenced for inter-frame coding. In the case where there exists a motion vector in the block and the size of the motion vector is not less than a threshold level, step S75 determines the angular difference between the particular motion vector and the motion vector of the particular block. In the case where this angular difference is not more than the threshold level, the condition for judgement is considered met, and the process proceeds to step 76. In the case where there exist no motion vectors of the same type referenced (in forward or reverse direction), one motion vector is multiplied by a factor of −1 before judgement. Also, in the case where the block at the same spatial position in the frame referenced is an intra-frame coded block, the judgement in step S75 is considered affirmative and the process proceeds to the next step.

Figure 18A:
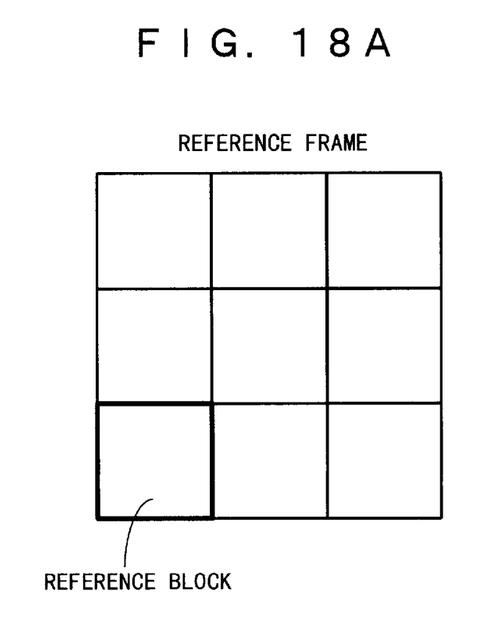
FIGS. 18A and 18B are diagrams for explaining a modification of process 3.
Figure 18B:
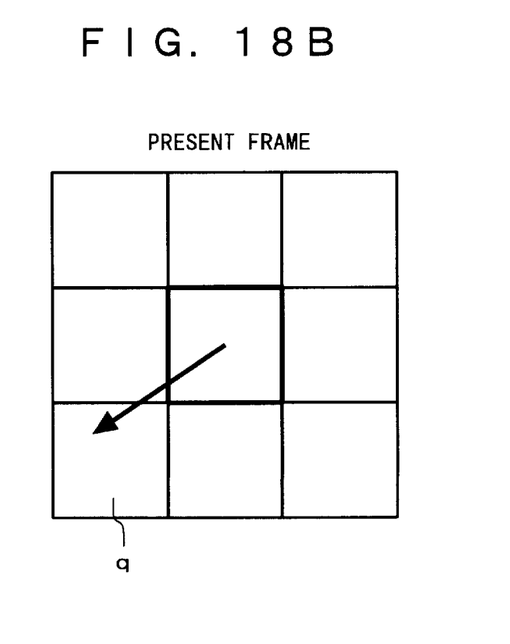

The reference frame and a frame at a position symmetrical with the present frame can also be judged the same way. On the judgement of the frames in the temporal past and the temporal future, the logic sum and the logic product can be used as the moving object detection information. As a modification, the position of the reference block can be considered not the spatially same position but, as shown in FIGS. 18A, 18B, the position of a block q in which the forward end of the motion vector arranged at the central block of the present frame is included.

In the above-mentioned process, steps S41, S42 and S71 are processed in the basic moving object detector 82, while steps S43 and S44 are processed in the bidirectional predictive-coded block moving object detector 84.

Figure 16:
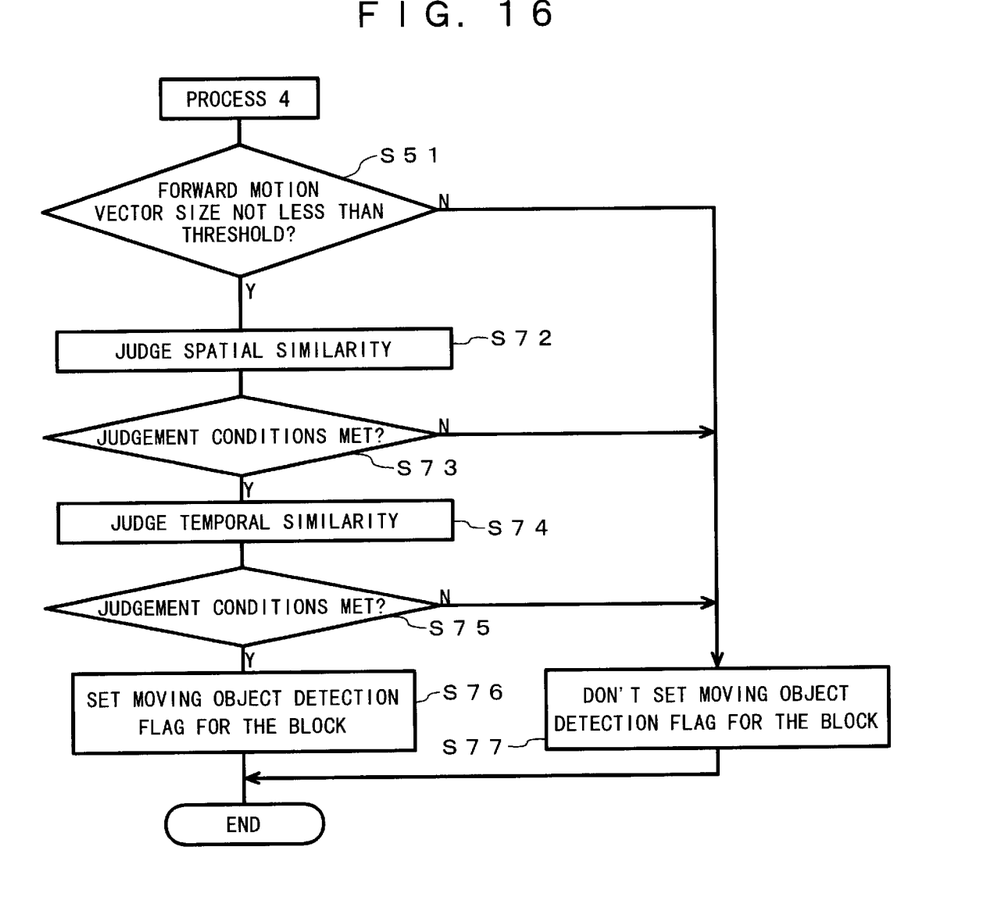
FIG. 16 is a flowchart showing the operation of process 4.
Figure 17:
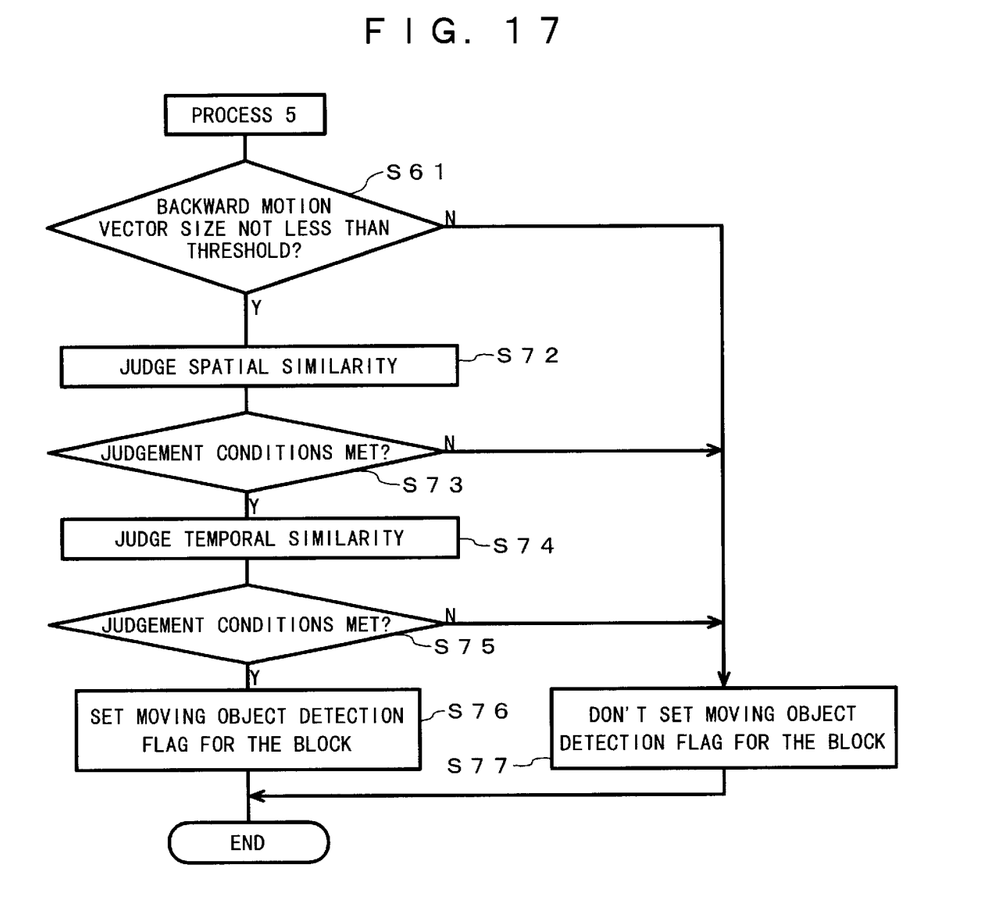
FIG. 17 is a flowchart showing the operation of process 5.

Now, the operation of the processes 4 and 5 according to this embodiment will be explained with reference to FIGS. 16 and 17. The process 4 includes the step S51 executed by the basic moving object detector 82. In the case where the judgement in this step is affirmative, the process of steps S72 to S77 is performed. In the process 5, on the other hand, step S61 is performed by the basic moving object detector 82, and then if the judgement is affirmative, steps S72 to S77 are executed. These steps are already described and will not be explained again.

According to this embodiment, in which steps S72 to S75 are added to the above-mentioned first embodiment, and therefore, a moving object can be detected with a higher accuracy than in the first embodiment. In the second embodiment, like in the first embodiment, a texture flag detected by the texture information detector 7 can be reflected as described above.

Although the moving object detection process is performed by the decoding processor in the embodiments described above, the invention can be modified in such a manner that the moving object detection process is performed not at the time of decoding process but at the time of compression coding of a moving picture. Also, the present invention is applicable to the coded data of a moving picture using an internationally-standardized coding scheme such as MPEG2 or H261 as well as MPEG1. In addition, the invention can be equally applied not only to the coded data by DCT but also to the data compressed by the wavelet transform, vector quantization, etc. and subjected to motion compensation.

It will thus be understood from the foregoing description that according to this invention, a moving object area can be detected effectively without reproducing complete moving picture information from the compressed moving picture information. Therefore, it is not necessary to take a step such as to process a moving picture data large in data amount and further to compress them unlike in the prior art. Also, in the case where a moving picture is compressed in advance, the process is not needed for completely decoding a compressed moving picture to detect a moving object area from the compressed information.

Further, regardless of whatever prediction method is used for a compressed moving picture data, a moving object can be detected with high accuracy. Furthermore, the process is not required for burying the information for moving object detection at the time of compression coding. Regardless of the encoder used for coding the moving picture data, therefore, a moving object can be successfully detected.

What is claimed is:

1. A system for detecting a moving object in a moving picture by decoding a compressed data of an input moving picture and by adding moving object information to the decoded picture data, comprising:

compressed picture information extraction means for partially decoding the compressed data of a moving picture input for each block and extracting the picture information constituting a part of the data from said partially decoded data;

adaptive detection scheme selection means for classifying the moving object detecting by a coding mode for each frame and a motion compensation mode for each block obtained by said compressed picture information extraction means;

moving object detection prediction means for estimating the presence or absence of a moving object in a block using a motion vector of a spatio-temporally adjacent block selected by the adaptive detection scheme selection means in the case where said block is an intra-coded block and for outputting the moving object information; and basic moving object detection means for not detecting said block as a moving object area when the size of a motion vector of said block obtained from said compressed picture information extraction means is at least lower than a threshold level selected by the adaptive detection scheme selection means in the case where said block is not an intra-coded block and for outputting the moving object information.

2. A system for detecting a moving object in a moving picture according to claim 1, wherein said moving object detection prediction means estimates the presence or absence of a moving object for said block using the moving object detection information of a spatially adjacent block.

3. A system for detecting a moving object in a moving picture according to claim 1, wherein said moving object detection prediction means estimates the presence or absence of a moving object for said block using the moving object detection information of a temporally adjacent frame.

4. A system for detecting a moving object in a moving picture according to claim 1, further comprising bidirectional motion vector judgement means for improving the accuracy of moving object detection for said block using forward predictive motion vector information and backward motion vector information in the case where the predictive coding scheme for a frame associated with said block is bidirectional.

5. A system for detecting a moving object in a moving picture according to claim 1, further comprising spatial similarity judgement means for improving the moving object detection accuracy for said block using the motion vector information of a block spatially adjacent to said block.

6. A system for detecting a moving object in a moving picture according to claim 1, further comprising temporal similarity judgement means for improving the moving object detection accuracy for said block using the motion vector information of a block in a reference frame temporally adjacent to said block.

7. A system for detecting a moving object in a moving picture according to claim 1, further comprising:

texture information detection means for judging the presence or absence of a texture in the picture of said block from the low-frequency component and the high-frequency component of pixel frequency conversion data obtained from said compressed picture information extraction means; and means for reflecting the result of texture detection by said texture information detection means in the moving object detection for said block.

8. A system for detecting a moving object in a moving picture according to claim 4, further comprising:

texture information detection means for judging the presence or absence of a texture in the picture of said block from the low-frequency component and the high-frequency component of pixel frequency conversion data obtained from said compressed picture information extraction means; and means for reflecting the result of texture detection by said texture information detection means in the moving object detection for said block.

9. A system for detecting a moving object in a moving picture according to claim 5, further comprising:

texture information detection means for judging the presence or absence of a texture in the picture of said block from the low-frequency component and the high-frequency component of pixel frequency conversion data obtained from said compressed picture information extraction means; and means for reflecting the result of texture detection by said texture information detection means in the moving object detection for said block.

10. A system for detecting a moving object in a moving picture according to claim 6, further comprising:

texture information detection means for judging the presence or absence of a texture in the picture of said block from the low-frequency component and the high-frequency component of pixel frequency conversion data obtained from said compressed picture information extraction means; and means for reflecting the result of texture detection by said texture information detection means in the moving object detection for said block.

11. A system for detecting a moving object in a moving picture according to claim 1, further comprising a picture display means for displaying an area not detected as a moving object as distinguished from an area detected as a moving object according to the adding moving object information.

* * * * *